US00H002219H

(19) United States
(12) Statutory Invention Registration
Bayya et al.

(10) Reg. No.: US H2219 H
(43) Published: Jul. 1, 2008

(54) METHOD FOR COATING SMALL PARTICLES

(75) Inventors: Shyam S. Bayya, Falls Church, VA (US); Guillermo R. Villalobos, Springfield, VA (US); Jasbinder S. Sanghera, Greenbelt, MD (US); Ishwar D. Aggarwal, Springfield, VA (US)

(73) Assignee: The United States of America as represented by the Secretary of the Navy, Washington, DC (US)

(21) Appl. No.: 11/239,433

(22) Filed: Sep. 20, 2005

(65) Prior Publication Data

US 2006/0024436 A1 Feb. 2, 2006

Related U.S. Application Data

(63) Continuation of application No. 09/699,396, filed on Oct. 31, 2000, now abandoned.

(51) Int. Cl.
*B05D 7/00* (2006.01)

(52) U.S. Cl. ..... 427/212; 417/226; 417/215; 417/380

(58) Field of Classification Search ..... None
See application file for complete search history.

(56) References Cited

U.S. PATENT DOCUMENTS 4,948,527 A * 8/1990 Ritsko et al. ..... 252/301.4 R
5,063,267 A * 11/1991 Hanneman et al. ..... 524/284
5,087,607 A * 2/1992 Strom et al. ..... 505/425
5,196,229 A * 3/1993 Chau ..... 427/66
5,609,911 A * 3/1997 Okabe et al. ..... 427/212
5,747,100 A * 5/1998 Petersen ..... 427/64
5,800,922 A * 9/1998 Anderson et al. ..... 428/403
5,844,361 A * 12/1998 Petersen et al. ..... 313/495
5,949,184 A * 9/1999 Ohoshi et al. ..... 313/485
6,153,123 A * 11/2000 Hampden-Smith et al. ..... 252/301.4 S
7,074,521 B2 * 7/2006 Sheem et al. ..... 429/231.4

OTHER PUBLICATIONS

Masters, K., Spray Drying Handbook, 1985 (no mo.), John Wiley & Sons, 4th edn., pp. 1–7, 21, 30–31, 54–55, 144–147, 150–151, 178–179, 212–213, 273–293, 322–333.*

* cited by examiner

*Primary Examiner*—Michael J. Carone
(74) *Attorney, Agent, or Firm*—John J. Karasek; Stephen T. Hunnius

(57) ABSTRACT

The coating method includes the steps of dissolving coating precursor(s) in a solvent to form a precursor solution: adding with mixing a miscible diluent to the precursor solution to form a coating solution; admixing solid particles to the coating solution to form a coating slurry, with the particles surrounded with the coating solution; spraying the coating slurry to form droplets containing at least one particle; passing the droplets through a drying zone where the droplets are dried and form dry particles coated with a coating material formed from the coating precursor(s); heat-treating the coating material on the particles emanating from the drying zone to remove volatile matter on the coating material, to improve integrity of the coating material and/or to effect another objective; and collecting dry coated particles.

19 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR COATING SMALL PARTICLES

REFERENCE TO RELATED PATENT APPLICATION

This is a continuation patent application of application Ser. No. 09/699,396 entitled "Method for Coating Small Particles" filed Oct. 31, 2000 now abandoned.

BACKGROUND OF THE INVENTION

1. Field of the Invention

This invention pertains to a method for coating particles.

2. Description of Related Art

Particles can be coated using a variety of techniques including fluidized bed, sol-gel, sputtering and evaporation. Since all of these techniques are batch type, meaning that the coating processes are not continuous and must, therefore, be filled and emptied, high product yields necessitate large processing chambers or a multitude of smaller chambers. Spray drying has been used to produce powders from precursor solutions requiring chemical reactions or from slurry mixes of the final components. Marsh U.S. Pat. No. 4,713,233 used spray drying to produce porous oxide powders from alkoxide solutions. To-date, this process has not been used for coating particles.

Although coated particles are used in many different applications, an important one is in electronic display devices which are visual interfaces between users and the information the users seek.

Some commercial applications of flat panel displays include laptop computers, avionic displays, automobile dashboards, navigation displays, video phones, medical systems, pocket notepads, and miniature displays. Military applications include wall-size command control displays, avionic displays, navigational displays, and head-mounted displays for soldiers.

The desired flat panel displays are thin, lightweight, have good brightness, have sharp contrast, colors, and have wide viewing angle. For example, displays used by soldiers on the battlefield should be able to withstand harsh environmental conditions, should be lightweight, should provide a wide viewing angle, should provide viewing in bright light, and have high resolution.

Various display technologies exist or are under development for flat panel displays. These flat panel displays include active matrix liquid crystal displays, electro luminescent displays, plasma displays, and field emission displays (FEDs). Each technology has its own merits and demerits and finds applications in various niche areas.

Flat panel field emission displays contain millions of micro-sized field emitters-arranged in a matrix. These field emitters are addressed, in a matrix, a pixel row at a time. The emitted electrons are accelerated toward the pixels on a screen a few millimeters away by an accelerating voltage. Each pixel is addressed by a large number of field emitters. An individual pixel consists of red, green and blue sub-pixels. Based on the desired color from an individual pixel, the corresponding sub-pixel is addressed and the phosphor is excited producing its characteristic color.

Phosphor particle selection and their requirements vary based on the conditions of their use. Field emission displays work under relatively low voltage of about 50 V–10 kV and relatively high current density of about 1–100 $\mu A/cm^2$ in contrast to cathode ray tubes that operate at high voltage of about 15,000–30,000 volts and low current density. At the low accelerating voltages used in field emission displays, slow impinging electrons do not penetrate very deeply into bulk of the phosphor, further increasing the current density at the phosphor surface. If the phosphor surface is resistive, this high current density can lead to serious charging, local heating, and thermal breakdown.

Most of the commonly used phosphors in cathode ray tubes, field emission displays and electroluminescent displays are sulfides that have highly resistive surfaces and typical particle sizes in the range of 1-10 microns. Some commonly used cathode ray tube phosphors are ZnS:Ag, Cl (blue), ZnS:Cu (green),$Y_2O_3$:Eu (red), and $Y_2O_3S$:Eu (red) which are now being modified for field emission display applications. Some of the newly developed electro luminescent display phosphors, that maybe used in field emission display devices, are also sulfides:$CaGa_2S_4$:Ce (blue), $SrGa_2S_4$:Ce (blue), Zns:Tb (green) $SrGa_2S_4$:Eu (green), CaS:Eu (red), (Ca, Sr)$Ga_2S_4$:Ce, (Ca, Sr)$Ga_2S_4$ and mixtures thereof. Under high coulomb charging, the surface temperature of resistive phosphors increases thereby resulting in dissociation and surface degradation or aging. Sulfur dioxide and hydrogen sulfide gases evolve from the phosphor surface and can damage the field emitters. The longer address times associated with the high current densities used in field emission displays make the conditions worse and result in severe current saturation and phosphor degradation. In many cases, aging is accelerated by heat that is associated with phosphor charging. Since efficiency of the phosphor decreases as the accelerating voltage is decreased, the current density is increased to maintain brightness. The efficiency is further lowered by the high current densities involved in the process due to surface charging and aging. Hence, the phosphors currently used in field emission displays have very poor efficiency and service lifetimes.

Improvements in the efficiency of existing phosphors can be realized by reducing their resistivity, controlling their grain size, and modifying the surface chemistry of the phosphor particles. The efficiency of a phosphor can also be increased by using the quantum confinement effect. This is achieved by using quantum dots, i.e., less than 10 nm-sized particles. However, the nanocrystalline quantum dot phosphors have very large surface areas that result in electron traps from impurities at the surface and the traps reduce the observed efficiency of the nanophosphors. Each individual nanocrystalline quantum dot must be isolated or prevented from agglomeration to observe quantum effect. All the problems, such as surface degradation, environmental effects, and aging, discussed in the case of microcrystalline or large phosphors, still exist in the case of nanocrystalline phosphors. These problems can be solved by using appropriate protective coatings on the phosphors used in electroluminescent displays, cathodoluminscent displays, and field emission displays.

It should be understood that in addition to phosphor particles, other organic, inorganic and inorganic/organic hybrid particles can be used in the coating method claimed herein for other applications.

Electrically conducting, non-conducting, luminescent and other coatings can be used to isolate the particle from its surroundings and thereby protect the particle from degradation or reaction with its environment. The coating can also be used to protect the environment from species evolving from the particle. The primary use of this type of coating is to protect phosphors in field emission display devices. Phosphors degrade as a result of electron bombardment and the resulting electrical charging and heating. The coating serves to encapsulate the phosphor and, if it is a conductive coating, to conduct electrical charge away from the particle surface. If the coating is luminescent, one or more of such coatings can be placed on a particle to change the light spectrum of the system. This can be used in emissive displays and in solid state lighting devices.

In structural applications, the coating can be used to change interfacial thermal expansion coefficients, thermal conductivity, deposit mechanically advantageous grain boundary materials, such as grain pinning, grain size, shape and distribution, and provide a lower temperature sintering aid. The coating can also be used to shorten diffusion paths in solid state synthesis procedures, sol-gel and spray pyrolysis coating methods. In the sol-gel coating technique, the particles are coated while in suspension in the precursor solution. Once the particles are coated, the solvent is removed. This results in a batch type process that does not readily lend itself to industrial scale-up. Sol-gel coating methods also suffer from the need to exercise considerable care in maintaining exact pH and temperature conditions to prevent precipitation of sol-gel phases. Furthermore, the sol-gel phase may not nucleate on the powder particles thereby producing poor coatings and individual particles of the gel phases. Multi-component sol-gel phases may precipitate out of solution as individual phases. Spray pyrolysis method is used to manufacture particles from solutions containing dissolved species. The solution is sprayed into a hot zone or drying chamber. The solvent evaporates and leaves behind particles of the desired composition.

For present field emission display commercial applications, phosphors operating under accelerating voltages of 50–10,000 volts, must last in excess of 10,000 hours of continuous operation without losing 50% of the original brightness. Presently, the phosphors do not meet this standard. In an unobvious and an unexpected aspect of this invention, the invention disclosed herein makes it possible for such phosphors to meet the standard.

OBJECTS AND BRIEF SUMMARY OF THE INVENTION

An object of this invention is a coating method for particles which provides greater coating uniformity, greatly decreased agglomeration of the particles and greater coating continuity compared to coatings prepared by other methods.

Another object of this invention is a coating method for small particles that is completely enveloping thus providing hermeticity to the particle(s) within, that can provide a continuous electrical path although the coating need not be completely enveloping, and/or can provide sufficient coating volume to render the coated particles luminescent.

Another object of this invention is improved phosphor efficiency and service lifetime both for the phosphor particles and the electronic display device wherein the phosphor particles are used.

Another object of this invention resides in the fact that current production lines and procedures for making electronic display devices do not require costly modification to enable the use of phosphor particles coated as disclosed herein.

These and other objects can be achieved by a coating method which is characterized by preventing precipitation of the coating solution on particles to be coated until the particles enter a drying zone. Prior to passing through the zone, the particles are contained within a droplet.

DETAILED DESCRIPTION OF THE INVENTION

Figure 1:
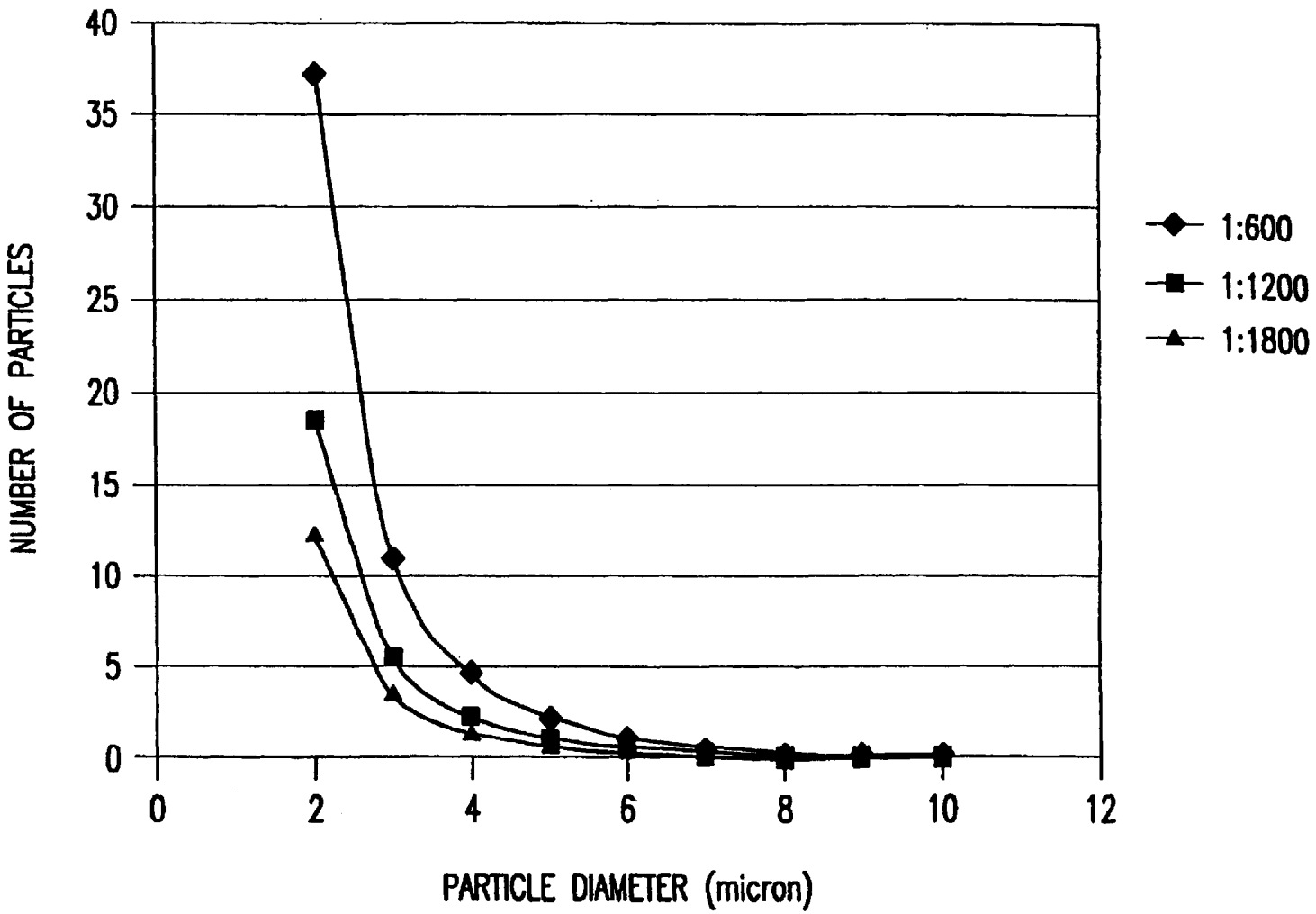
FIG. 1 is a graph showing the relationship between dilution of the coating solution and number of particles in each droplet.

This invention pertains to a coating method that can be continuous or batch, is controllable, is not capital intensive and is characterized by provision of a uniform continuous coating on a particle. The coating on the particles can be completely enveloping and can provide hermeticity to the particle(s) within, can provide a continuous electrical path and/or can provide sufficient coating volume to render the coating luminescent.

In the conduct of the coating method of this invention, the particles are suspended in the precursor solution in the same fashion as in the sol-gel method. However, in the method of this invention, no attempt is made to coat particles while in suspension and coating of the particles while in suspension is discouraged, as by adjustment of pH, temperature of the suspension and/or other parameter(s). The particles and the solution thereon are then sprayed into a drying zone generating droplets of coating solution with each droplet containing at least one particle, which results in evaporation of the solvent from the particle surface leaving behind the precursor which is then converted to the coating. In the method of this invention, the particles are essentially uncoated at the spray nozzle and are coated by the time they reach the collection chamber. The coated particles are then heat-treated to render the coating on the particles electrically conducting, robust and/or whatever else the objective may be.

The method of this invention can be used on a wide range of particle sizes and compositions and applies to a wide range of coating thicknesses as well as multiple coating layers of multi-functionality. The coating material can be inorganic, organic or a hybrid thereof Suitable particle size can vary widely from the smallest to the largest, but typically, the particle size is in the micrometer range of up to 100 microns in diameter, more typically up to 50 microns, and most typically 1–20 microns, especially 1–10 microns. The particles can also be in the nanometer range of up to about 1000 nm, typically up to about 500 nm, and more typically 1–250 nm, especially 2–100 nm. The particles are typically in powder form, although they need not be, and contain a proportion of individual particles and agglomerates thereof where two or more particles are bound together and form an agglomerate of particles. The sizes given above apply to individual particles and agglomerates thereof. The agglomerates typically have larger average diameters than individual particles. Relative amount of individual particles to agglomerate in a batch varies widely from batch to batch and also depends on the manufacturer. Typically, the variation of individual particles to agglomerates is 20–80% more typically about 50%, on volume basis. Although agglomerates may contain a number of particles, for purposes herein, an agglomerate is considered to be a single particle.

The composition of the particles can also vary widely from electrically conducting to electrically non-conducting and luminescent. Typically, phosphor particles are used in electronic display devices, such as field emission displays, where the coating protects the particles which particles degrade as a result of electron bombardment and the concomitant electrical charging and heating.

In order to fully coat the particles or provide complete hermeticity, it may be necessary to coat the particles more than once. Also, particles of the coating material, can also be present since volume of the coating material on a particle is unexpectedly high. To demonstrate the unexpectedly high volume of the coating material on a coated particle, a 90 nm thick coating on a 5-micron particle is equivalent to about a micron particle of the coating material. Particles of the coating material, as well as uncoated particles, also decrease efficiency and brightness of a batch of coated particles containing a preponderance of coated particles where the coating material is different from the particles and a lesser amount of uncoated or partially coated particles and particles of the coating material. Particles of the coating material are significantly reduced by this method.

The coating method of this invention includes the steps of dissolving a coating precursor in a solvent to form a precursor solution; optionally adding with mixing a miscible diluent to the solution to form a coating solution; adding with mixing solid particles to the coating or precursor solution to form a coating slurry which need not contain the diluent, with the particles surrounded with the coating or precursor solution; adjusting temperature, pH and/or another parameter to discourage precipitation on the particle surface; delivering the slurry to an atomizer without separating the particles from the coating solution; atomizing or spraying the slurry in the form of droplets through a drying zone to remove volatile matter from the surface of the particles, with the droplets containing at least one particle; heat-treating the coated particles; and collecting the heat-treated coated particles.

The precursor solution is prepared by dissolving a coating precursor in a solvent. The solvent can be any liquid or a mixture thereof that can dissolve the precursor including water, alkane, lower alkyl alcohol, benzene, toluene, diethyl sulfoxide, and the like. Typically, the solvent is water or a lower alcohol, such as ethanol or isopropanol. All of the above, or mixtures thereof, can be used as diluents. If more than one precursor is used, then appropriate miscible solvents are employed. Depending on the coating desired, suitable precursors include alkoxides, nitrates, sulfates, acetates, hydroxides, hydrates, chlorides and other precursors that can be dissolved in aqueous or non-aqueous liquids. The precursor solution can be obtained as such.

Of particular interest herein are liquid indium methyl (trimethyl) acetyl acetate and solid tin isopropoxide precursors which form an electrically conducting indium tin oxide coating on the particles; tetraethyl orthosilicate precursor that forms an electrically non-conducting silicon dioxide coating; magnesium nitrate precursor that forms an electrically non-conducting magnesium oxide (MgO) coating; and yttrium chloride and europium chloride precursors that form a luminescent yttrium-europium oxide coating. Magnesium oxide produces more secondary electrons than most materials when excited by a primary electron beam. Secondary electrons have on average about 50 eV of energy. Since less than about 20 eV energy is needed for luminescence, magnesium oxide is a premier material for luminescence purposes because it produces an inordinate amount of luminescence in the phosphor particles due to multiple excitation of activator sites.

After making the precursor solution, a diluent can be optionally added to dilute it to the desired level and form the coating solution. The diluent is miscible with the precursor solution and is used to render the precursor solution dilute so that it contains fewer particles per droplet. As should be apparent, a more dilute coating solution will have fewer particles in a droplet. Although water can be a suitable diluent in many instances, other diluents can also be used, such as the common solvents, due to the ease of removing them when a droplet is passed through the drying zone. The common solvents include ethanol, methanol, isopropanol, benzene, toluene, water, and mixtures thereof. Typically, a diluent with a low boiling point is selected since it is easier to remove it in the drying zone.

After preparing the coating solution, the particles are then added thereto to form the coating slurry. The particles are solid and when they are added to the coating solution, what results is a coating slurry of solid particles distributed in the liquid coating solution. Dilution is important since it affects the number of particles in a sprayed droplet. If the coating solution or the coating slurry is too dilute, some droplets may not contain any particles and the coating material will then form a particle of the coating material. The opposite extreme results in formation of large agglomerated clusters of particles. Although the ideal is to have one particle per droplet, dilution resulting in solid/liquid ratio should be such as to spray 1–3 particles per sprayed droplet. Dilution ratios of liquid/solid should typically be 100–5000, more typically 200–3000, and particularly 300–2000.

FIG. 1 is a graph showing the relationship of dilution and particle size on the number of particles per droplet. The curves represent solid/liquid dilution ratios of grams of phosphor particles to milliliters of coating solution. For instance, on the basis of FIG. 1, a sprayed droplet will contain 5 phosphor particles of 4 microns each at a dilution ratio of 1:600 whereas at a dilution ratio of 1:1800, a droplet will contain about 2 particles each of 4 micron diameter. It should be apparent from FIG. 1 that the number of particles declines as the dilution is increased, however, the dilution ratio curves appear to merge for particle diameters in excess of about 9 microns.

Sometime during preparation of the coating solution or the coating slurry or after preparation of the coating slurry, an adjustment should be made of temperature or pH or of another parameter to prevent or discourage precipitation on the surface of the particle. If the conditions are right and no precipitation takes place, then there is no need to make any adjustment and the coating slurry is sprayed in the condition that it is in. For instance, when preparing a coating solution containing indium methyl (trimethyl) acethyl acetate and tin propoxide precursors, it was found that maintaining the coating solution at an acidic pH of 4.5 at room temperature did not result in precipitation on the particle surface when the particles were mixed into the coating solution. The coating solution made with tetraethyl orthosilicate, water, hydrochloric acid in ethanol, was maintained at acidic pH of 2 at room temperature also did not result in precipitation on the particle surface. Precipitation on the particle surface was prevented by maintaining the magnesium nitrate in isopropanol coating solution at neutral pH of about 7 at room temperature. Precipitation on the particle surface was also prevented in the yttrium chloride and europium chloride aqueous coating solution.

Precipitation reactions are common kind of metathesis reacion in which one of the products is an insoluble solid, called precipitate, which separates from solution. A gel is a continuous solid skeleton enclosing a continuous liquid phase.

The coating slurry conveyed to an atomizer or sprayer should be agitated to maintain the particles suspended in the coating solution. Typically, a conduit or tubing is used for this purpose.

The coating slurry, which is a dilute solution of the precursor(s) and the particles dispersed therein, is then delivered to an atomizer where the slurry is subdivided into droplets which are then sprayed into a drying zone where vaporizable matter is removed from the particles and the coating is formed thereon. The droplet size can be up to 1000 microns, but is typically up to 500 microns, more typically 5 nm to 250 microns, and especially 50 nm to 50 microns. Any suitable atomizer can be used, including mechanical, piozoeleric and electrostatic, as long as droplets contain the desired number of particles are formed and the preponderance of resulting coated particles are completely or hermetically sealed or coated.

Whatever atomizer is used, chemistry of the coating slurry should be such as to prevent precipitation on the particles, the particles should be suspended in the coating slurry, and the droplets issuing from the atomizer should contain 1–3 particles per droplet. Typically however, an ultrasonic atomizer is used at a variable frequency since size of a droplet can be controlled by varying atomizer frequency. For instance, at atomizer frequency of 20 kHz, droplets of 90 microns can be formed; at frequency of 40 kHz, droplets of 45 microns can be formed; and at 80 kHz, droplets of 20 microns droplet can be formed. The inverse relationship between atomizer frequency and the droplet size can be used to control the droplet size.

The higher the temperature in the zone, the less residence time is required of the droplets in the zone to have the vaporizable matter removed from and the coating formed thereon. The temperature in the zone should be high enough to drive-off volatile matter from the particles but not so high as to impart thermal damage to the particles or the coating. Furthermore, temperature in the zone should be high enough to drive-off volatiles from the particles in a reasonable or desired time, which can be adjusted by changing temperature in the zone, with higher temperature in the zone reducing residence time of the droplets to form dry, coated particles. Typically, depending on many factors, temperature in the zone should be in excess of about 100° C. and below about 500° C., more typically 200° C.–400° C.; and velocity of the droplets in the zone is typically 0.1 to 1000 cm/sec., more typically 1 to 50 cm/sec. When moving in the zone, the droplets/coated particles are entrained in hot air or an inert gas or a reactive gas. Residence time in the zone is instantaneous to a fraction of a minute, preferably 0.1 to 10 seconds.

Reaction of the precursor component(s) may take place wholly or partially when the precursor solution is sprayed in the zones which are typically maintained at an elevated temperature.

The coated particles issuing from the zone should be dry and are collected in a chamber and then heat treated to accomplish various objectives including, converting the coating from amorphous, which is electrically non-conducting, to crystalline, which is electrically conducting; improving electrical conductivity of the coating; and improving integrity of the coating, i.e., making it tougher and more durable. Typically, the heat treating temperature should not degrade the coated particles and should be above a temperature at which matter remaining on the coated particles after passage through the zone can be removed and below a temperature at which the coated particles are degraded in a reasonable time. More specifically, the heat-treating temperature should be about 50–2000° C. and duration of 0.01–48 hours, more typically 300–1500° C. and duration of 0.1–24 hours. The heat treating temperature should be higher than the drying temperature of the coated particles moving through the zone to drive-off reaction products, carbon and/or hydrocarbons to convert amrphous material to crystalline and/or to render the coated particles electrically conducting or to improve electrical conductivity thereof, or to improve integrity of the coating on the particles, or to accomplish another objective which requires the heat-treating step.

The coating thickness on the particles can be varied, inter alia, by adjusting dilutions of the coating solution and/or by adjusting frequency of the atomizer, if an ultrasonic atomizer is used. Although a thicker coating will provide better protection to the particles, generally speaking, thick coatings cost more because more of the coating material is used and function of the particles may be jeopardized. For purposes herein, it has been found that coating thickness in the range of 1–1000 nm, more typically 2–200 nm, is suitable.

Figure 2:
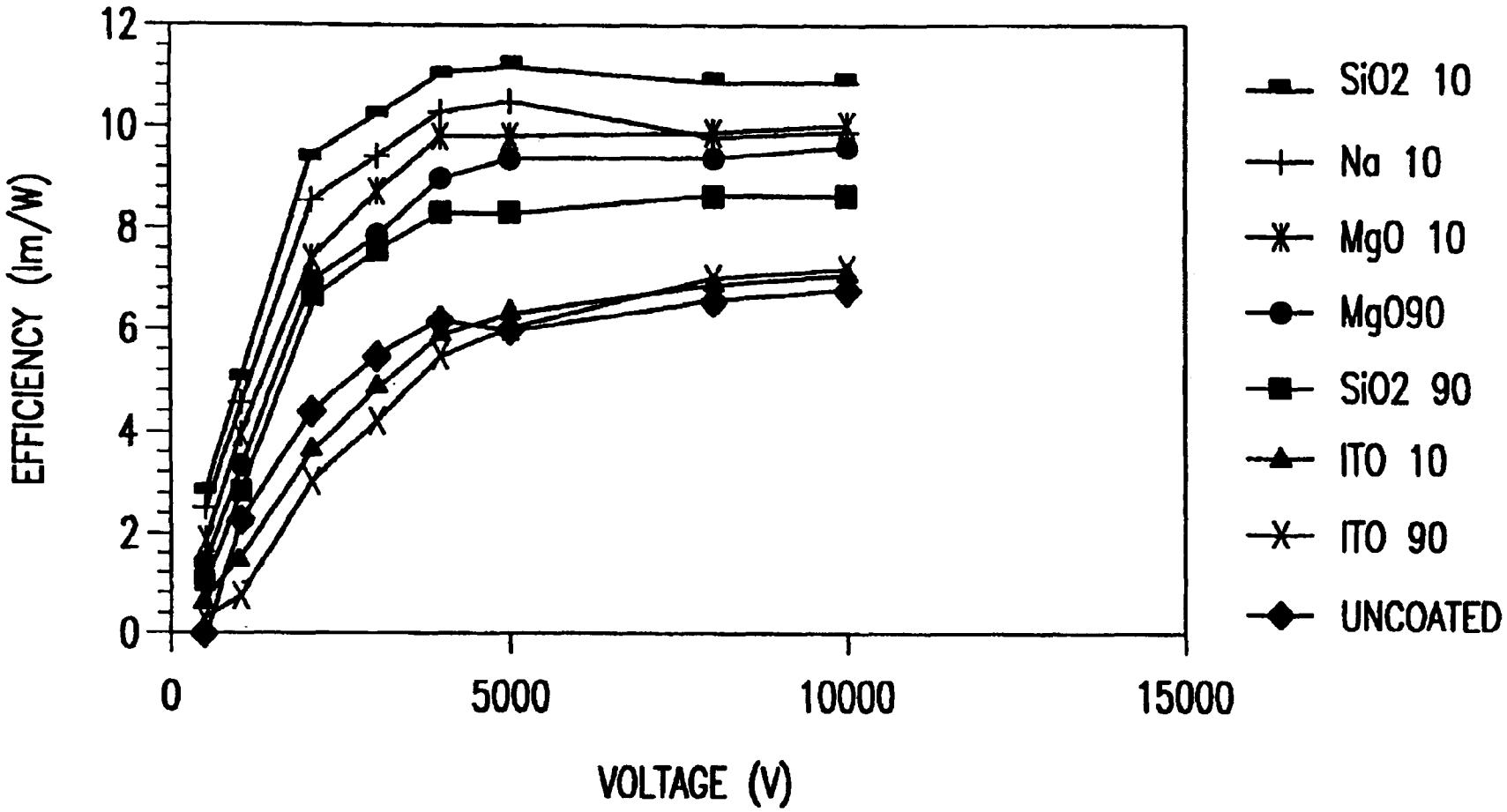
FIG. 2 is a graph which shows improved phosphor efficiency for ZnS:Ag phosphors coated with a 10 nm and 90 nm coatings of different materials by the coating method disclosed and claimed herein compared to uncoated phosphors.

FIG. 2 is a graph which demonstrates that efficiency of the coated particles is not jeopardized by the coatings. The plot is of voltage v. efficiency (brightness) for coatings made using ZnS:Ag phosphors which luminesce blue, i.e. standard phosphors for TV, coated with silicon dioxide ($SiO_2$), sodium phosphate [$Na(PO_3)_6$], magnesium oxide (MgO), and indium tin oxide (InSnO;ITO), at 10 nm and 90 nm thicknesses. As shown on FIG. 2, efficiency of the coated phosphors is higher than the uncoated particles. At 10,000 volts, the uncoated phosphor particles had efficiency of about 7 lm/W whereas identical phosphor particles coated with a 10 nm thick layer of silicon dioxide had a higher but not a significantly higher efficiency of about 11 lm/W. Although as FIG. 2 demonstrates, coating of the phosphor particles generally results in improved efficiency, what FIG. 2 also demonstrates is that coating of the phosphor particles does not degrade the main function of the particles.

Figure 3:
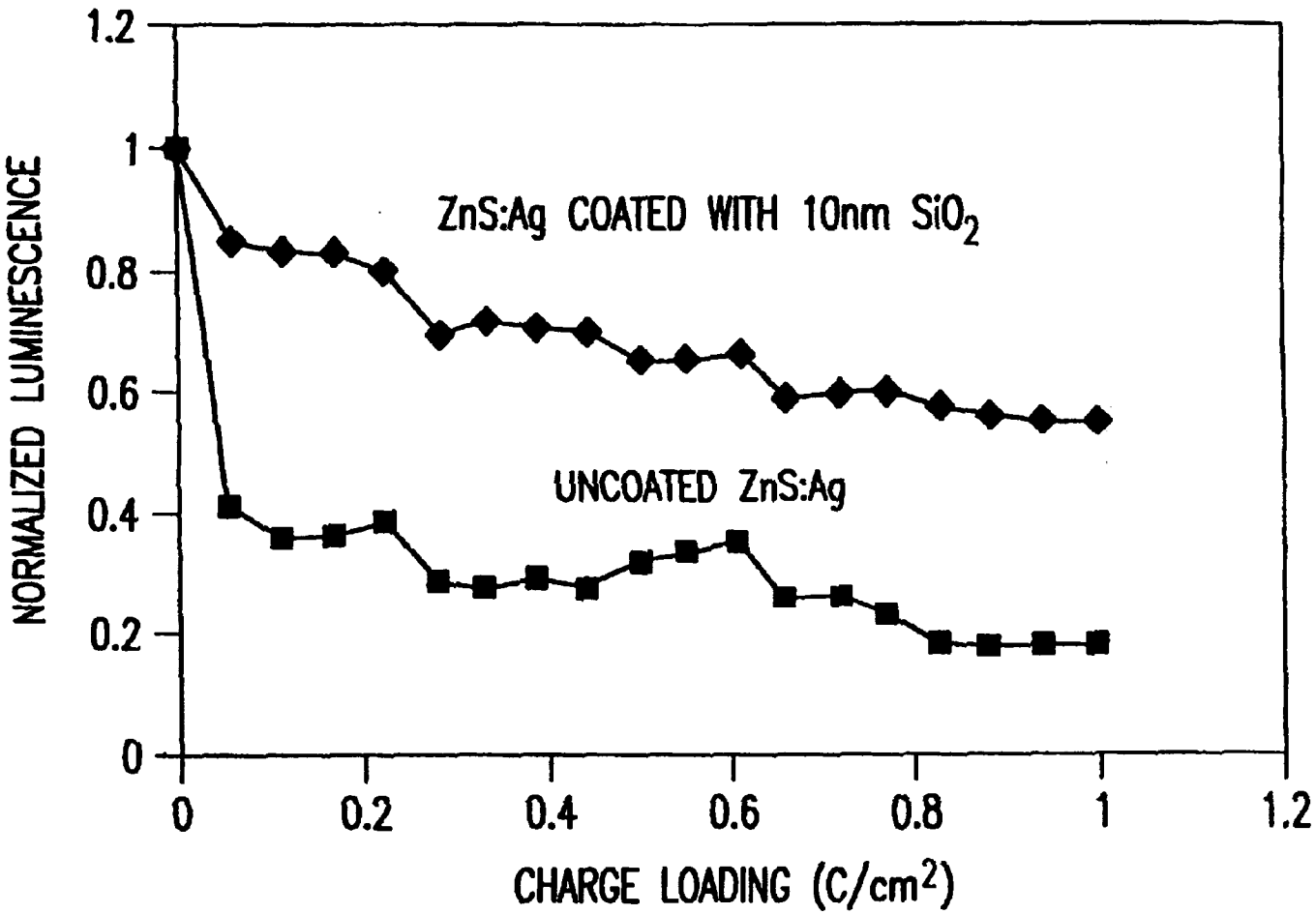
FIG. 3 is a graph which shows improved service lifetime for ZnS:Ag phosphors coated with a 10 nm of $SiO_2$ by the coating method disclosed and claimed herein compared to uncoated phosphors.

FIG. 3 demonstrates aging of coated and uncoated ZnS:Ag phosphor particles over a test period of about 100 hours. The coating was 10 nm thick layer of silica ($SiO_2$). FIG. 3 shows that at end of the aging test, brightness of the uncoated phosphor particles was about 20% of initial brightness whereas the coated phosphor particles had brightness of about 60% of initial brightness, or brightness of about 3 times that of the uncoated particles. These coated phosphors easily exceed the present standard of up to a 50% reduction in brightness over 10,000 hours of usage. This difference in brightness was very large and unexpected. Considering the fact that test amperage was 100 millamps whereas in a typical FED comparable amperage is 0.003 mA.

Uniformity of coating for the FIG. 3 coated particles was confirmed by scanning electron microscope and hermeticity or complete coverage of the particles was confirmed by immersing for 15 minutes the coated particles in 12 M of hydrochloric acid which is inert to the coating but attacks the phosphor particle material. Any discontinuity in the coating on the particle would allow the acid to attack the particle and disintegrate the material. Attack of the particle by the acid accompanied by bubbling serves as a test for indicating completeness of the particle coating. Also, as another test for hermeticity, since acid will attack the phosphor particle material, if the coating is not continuous, the acid will degrade and/or consume it. For a particle made from a different material, another substance may have to be found which functions similarly to hydrochloric acid on the phosphor material.

Having described the invention, the following examples are given as particular embodiments thereof and to demonstrate the practice and advantages thereof. It is understood that the examples are given by way of illustration and are not intended to limit the specification or the claims in any manner.

Example 1

This example details the steps to make a non-metallic indium tin oxide electrically conducting coating on a microcrystalline phosphor.

In this case, a 90 nm (15 wt %) indium tin oxide coating on a Nichia ZnS:Ag,Cl phosphor particles composed of a mixture of particles of 1–7 microns in diameter and agglomerates 3–9 microns in diameter. A precursor solution was made by mixing in 250 ml of isopropyl alcohol, 1.1 g indium methyl (trimethyl) acetyl acetate and 0.054 g tin isopropoxide. Since the indium and tin alkoxides are not stable in the presence of water, the reaction was carried out in isopropanol that was previously distilled in the presence magnesium to remove any dissolved water from the solvent.

A standard precursor solution "A" of 1.1 g of liquid indium methyl (trimethyl) acetyl acetate and 0.054 g solid tin isoporoxide in 250 ml of isopropanol was prepared in a dry box and sealed. Once the alkoxides are in solution, they do not react with water at temperatures below 90° C. unless hydrochloric acid is added as a catalyst.

The coating slurry was prepared by mixing one gram of phosphor particles with 1.5 ml water to initiate hydrolysis in the precursor solution, 150 ml of the standard solution "A", and 450 ml of isopropyl alcohol. The contents were ultrasonically mixed for 5 minutes in a mixing chamber and transferred to a holding chamber. The slurry at pH of 4.5 was delivered to an ultrasonic atomizer aerator at a rate of 2 ml/min using a peristaltic pump and sprayed at room temperature. The atomizer was operated at a frequency of 20 kHz: The atomizer produced a fine stream of 90-micron droplets that were passed through a 250° C. drying zone at a rate of about 9 cm/sec before being collected in a Pyrex beaker at room temperature. The drying zone was about 15 cm long. Dried and coated phosphor particles were removed from the collection chamber and then heat treated at 450° C. for 2 hours to convert electrically non-conducting amorphous indium tin oxide to crystalline electrically conducting indium tin oxide. The ZnS phosphor particles in powder form coated with indium tin oxide were characterized by X-ray diffraction, scanning electron microscopy, and X-ray fluorescence.

Example 2

This example details the steps to make non conductive 90 nm thick $SiO_2$ coatings on ZnS:Ag, Cl phosphor particles described in Ex. 1.

A stock solution was made by mixing 0.08 ml tetraethyl orthosilicate, 30 ml ethanol, 0.2 ml water and 0.62 ml hydrochloric acid. One gram of the same phosphor particles as in Ex. 1 was mixed with 2.1 m. of the stock solution and 600 ml ethanol. The slurry, at room temperature and at pH of 4.2, was sprayed into a drying zone maintained, as in Ex. 1, at 350° C. and heat-treated at 450° C. for 2 hours. X-ray diffraction of the coated powder showed the presence of ZnS and a broad amorphous hump from $SiO_2$. Scanning electron microscope investigation showed the presence of a coating on the particles while energy dispersive x-ray analysis showed the presence of Zn, S, Si and O. Immersing the coated and un-coated phosphor particles in 0.1 molar and 12 molar hydrochloric acid was used to determine continuity of the coating. After 10 minutes, the un-coated phosphor in 0.1 molar hydrochloric acid showed evidence of acid attack on its surface while the coated sample did not show any damage. The uncoated sample completely dissolved after immersion for 2 minutes in 12 molar hydrochloric acid whereas the coated sample was present after 5 minutes in 12 molar hydrochloric acid.

Example 3

This example demonstrates the application of a hybrid coating on phosphor particles.

The hybrid coating was formed on the phosphor particles of Ex. 1 by first coating the particles with a 90 nm thick layer electrically non-conducting silicon dioxide, as in Ex. 2, and then coating the coated particles with a 90 nm thick layer of electrically conducting indium tin oxide, as in Ex. 1.

Example 4

This example details the steps to make phosphor particles coated with electrically nonconducting magnesium oxide using metal salt precursor.

The stock solution was prepared by mixing 0.5 g of $Mg(NO_3)_2 6H_2O$ in 100 ml of deionized water. A neutral pH of the stock solution was maintained to prevent precipitation. Phosphor (ZnS:Ag,Cl) particles, same as in Ex. 2, were added to the stock solution and the resulting slurry was diluted with 500 ml of isopropyl alcohol, mixed and sprayed, as described in Ex. 1. Coated phosphor particles were heat treated at 700° C. for 2 hours. Analysis technique was the same as for the previous examples.

Example 5

This example details the steps to make an indium tin oxide coating on particles that are in an agglomerated state.

The coating of agglomerated particles with other coatings follow the steps outlined in Ex. 1–3. One gram of agglomerated particles were mixed with water, standard solution "A", and isopropyl alcohol, as outlined in Ex. 1. The pH of the coating slurry was 4.5 and its temperature was room temperature. The resulting slurry was sprayed under the conditions also outlined in Ex. 1.

Example 6

This example details the steps to make indium tin oxide coated agglomerates from unagglomerated ZnS:Ag,Cl phosphor particles.

One gram of the phosphor particles of Ex. 1 was mixed with 1.5 ml water, 150 ml of standard solution "A", and 250 ml isopropyl alcohol. The pH of the coating slurry was 4.5 and its temperature was room temperature. The increased concentration of the slurry ensured that there were numerous particles per droplet when the mixture was sprayed. The spray conditions were as outlined in Ex. 1.

Example 7

This example details the steps to make yttrium-europium oxide luminescent coatings on the ZnS:Ag,Cl phosphor particles.

One gram of the phosphor particles was mixed with 0.3 g of $YCl_3 \cdot 6\ H_2O$ and 0.0015 g $EuCl_3 \cdot 6H_2O$ in 1.8 liters of water. The neutral slurry was sprayed, as in Ex. 1, using atomizer operating at a frequency of 40 KHz which resulted in 45 ml droplets and then, the dry coated particles were heat-treated at 1,000° C. for 2 hours.

Example 8

This example demonstrates the use of 40 kHz atomizer that produces 45 micron droplets, slurry flow rates of 40 ml/min, with dilutions of 1:1800. The slurry was made as in Ex. 2, using 1800 ml of ethanol. The slurry was sprayed into a drying chamber and entrained in a 160° C. air stream. The coated particles were collected in a cyclone separator and then heat-treated as in Ex. 2, i.e., at 450° C. for 2 hours.

Example 9

This example demonstrates the use of a 1:1200 dilution ratio.

The procedure was the same as in Ex. 8 using 1200 ml of ethanol.

While presently preferred embodiments have been shown of the novel coating method and of the several modifications discussed, persons skilled in this art will readily appreciate that various additional changes and modifications can be made without departing from the spirit of the invention as defined and differentiated by the following claims.

What is claimed is:

1. A method for coating solid particles consisting essentially of the steps of (a) adding solid particles wherein solid particles are less than 100 microns in diameter to a liquid precursor coating solution to form a liquid slurry containing a precursor coating material, solvent for the precursor and the solid particles dispersed therein whereby the precursor coating material is not precipitated as a coating on the particle until after spraying, and mixing a precursor solution with a dilutent which dilutent is miscible with the precursor solution to form the coating solution, the precursor solution containing coating precursor during droplet formation, wherein the coating material is selected from the group consisting of indium tin oxide, silicon dioxide, magnesium oxide, sodium phosphate, yttrium-europium oxide, and mixtures thereof; and the precursor is selected from the group consisting of indium methyl (trimethyl) acetyl acetate, tin isopropoxide, tetraethyl orthosilicate, magnesium nitrate, yttrium chloride, europium chloride, sodium phosphate and mixtures thereof and wherein the particles are ZnS:Ag,Cl phosphor particles that can last for about 10,000 hours of continuous operation under accelerating voltages of 50–10,000 volts without losing 50% or more, of the original brightness, (b) then spraying the liquid slurry to form droplets containing at least one particle, (c) then passing the droplets through a zone where the droplets are dried and form dry coated particles wherein the coating material is then formed from the precursor wherein the residence time of the droplets through the zone is 1–5 seconds, the particles are phosphor particles, wherein temperature in the zone is elevated and the heat treatment of the coated particles is conducted at a temperature above the elevated temperature in the zone, and wherein the particles are less than about 50 microns in diameter, temperature in the zone is 100–500° C., dilution ratio in the coating slurry of milliliters of coating solution per gram of phosphor particles is 200–3000, thickness of the coating material on the particles is 2–200 nm, velocity of the droplets in the zone is 1–50 cm/sec. and residence time of the droplets in the zone is 0.1–10 seconds, (d) then heat treating the coating material on the particles to remove volatile matter from the coating material wherein said heat treating step is carried out at 50–2000° C. over a period of 0.01–48 hours, and (e) providing at least one more coating on the coated particles.

2. A method consisting essentially of the steps of (a) preparing a liquid precursor solution by dissolving a coating precursor in a liquid precursor solvent;

(b) mixing the precursor solution with a diluent, that is miscible with the precursor solvent, to form a liquid coating precursor solution;

(c) adding with mixing solid particles to the coating precursor solution to form a liquid slurry containing the coating precursor dissolved in the coating precursor solution and the solid particles dispersed therein whereby the precursor is not precipitated until after spraying;

(d) spraying the liquid slurry to form droplets containing at least one particle;

(e) passing the droplets through a zone where the droplets are dried and form dry particles coating with a coating material formed from the precursor solution;

(f) heat-treating the coating material on the particles to remove volatile matter on the coating material and to convert the coating material from electrically non-conducting amorphous to electrically conducting crystalline and/or to improve integrity of the coating material.

3. The method of claim 2 wherein temperature in the zone is elevated and the heat treatment of the coating particles is conducted at a temperature above the elevated temperature in the zone, and the precursor(s) is selected from the group consisting of alkoxides, nitrates, sulfates, acetates, hydroxides, hydrates, chlorides, and mixtures thereof.

4. The method of claim 3 wherein the particles are less than about 100 microns in diameter, dilution ratio in the coating slurry of milliliters of coating solution per gram of phosphor particles is 100–5000, thickness of the coating material on the particles is 1–1000 nm, velocity of the droplets in the zone is 0.1–100 cm/sec and residence of the droplets in the zone is from instantaneous to a fraction of a minute.

5. The method of claim 4 wherein the particles are less than about 50 microns in diameter, temperature in the zone is 100–500° C., dilution ratio in the coating slurry of milliliters of coating solution per gram of phosphor particles is 200–3000, thickness of the coating material on the particles is 2–200 nm, velocity of the droplets in the zone is 1–50 cm/sec, and residence time of the droplets in the zone is 0.1–10 seconds.

6. The method of claim 5 wherein the residence time of the droplets through the zone is 0.1–10 seconds, the particles are phosphor particles, and said heat treating step is carried out at 200–2000° C. over a period of 0.01–48 hours.

7. The method of claim 6 wherein said heat-treating step is carried out at 300–1500° C. over a period of 0.1–24 hours and wherein the coating material is selected from the group consisting of inorganic, organic and inorganic/organic hybrids.

8. The method of claim 7 wherein said heat-treating step is carried out at 300–1500° C. over a period of 0.1–24 hours and wherein the coating material is selected from the group consisting of indium tin oxide, silicon dioxide, magnesium oxide, sodium phosphate, yttrium-europium oxide, and mixtures thereof; and the precursor solution includes a precursor selected from the group consisting of indium methyl (trimethyl) acetyl acetate, tin isopropoxide, tetraethyl orthosilicate, magnesium nitrate, yttrium chloride, europium chloride, sodium phosphate and mixtures thereof.

9. A method for coating solid particles comprising the steps of:

(1) adding solid particles to a liquid precursor coating solution to form a liquid slurry containing a precursor coating material, solvent for the precursor and the solid particles dispersed therein whereby the precursor coating material is not precipitated as a coating on the particle until after spraying;

(2) spraying the liquid slurry of step (1) to form droplets containing at least one particle;

(3) passing the droplets of step (2) through a zone where the droplets are dried and form dry coated particles wherein the coating material is formed from the precursor; and (4) heat treating the coating material of step (3) on the particles to remove volatile matter from the coating material.

10. The method of claim 9 wherein temperature in the zone is elevated and the heat treatment of the coated particles is conducted at a temperature above the elevated temperature in the zone, and the precursor is selected from the group consisting of alkoxides, nitrates, sulfates, acetates, hydroxides, hydrates, chlorides, and mixtures thereof.

11. The method of claim 10 wherein the particles are less than about 100 microns in diameter, dilution ratio in the coating slurry of milliliters of coating solution per gram of phosphor particles is 100–5000, thickness of the coating material on the particles is 1–1000 nm, velocity of the droplets in the zone is 0.1–1000 cm/sec and residence of the droplets in the zone is from instantaneous to a fraction of a minute.

12. The method of claim 11 wherein the particles are less than about 50 microns in diameter, temperature in the zone is 100–500° C., dilution ratio in the coating slurry of milliliters of coating solution per gram of phosphor particles is 200–3000, thickness of the coating material on the particles is 2–200 nm, velocity of the droplets in the zone is 1–50 cm/sec, and residence time of the droplets in the zone is 0.1–10 seconds.

13. The method of claim 12 including the step of mixing a precursor solution with a diluent which diluent is miscible with the precursor solution to form the coating solution, the precursor solution containing coating precursor during droplet formation.

14. The method of claim 13 wherein the residence time of the droplets through the zone is 1–5 seconds, the particles are phosphor particles, said heat treating step is carried out at 50–2000° C. over a period of 0.01–48 hours, wherein said heat-treating step is carried out at 300–1500° C. over a period of 0.1–24 hours, wherein the coating material is selected from the group consisting of indium tin oxide, silicon dioxide, magnesium oxide, sodium phosphate, yttrium-europium oxide, and mixtures thereof; and the precursor is selected from the group consisting of indium methyl (trimethyl) acetyl acetate, tin isopropoxide, tetraethyl orthosilicate, magnesium nitrate, yttrium chloride, europium chloride, sodium phosphate and mixtures thereof, and wherein the particles are ZnS:Ag,Cl phosphor particles that can last for about 10,000 hours of continuous operation under accelerating voltages of 50–10,000 volts without losing 50%, or more, of the original brightness.

15. The method of claim 14 including the step of providing at least one more coating on the coated particles.

16. A method comprising the steps of:

(1) preparing a liquid precursor solution by dissolving a coating precursor in a liquid precursor solvent;

(2) mixing the precursor solution of step (1) with a diluent, that is miscible with the precursor solvent, to form a liquid coating precursor solution;

(3) adding with mixing solid particles to the coating precursor solution of step (2) to form a liquid slurry containing the coating precursor dissolved in the coating precursor solution and the solid particles dispersed therein whereby the precursor is not precipitated until after spraying;

(4) spraying the liquid slurry of step (3) to form droplets containing at least one particle;

(5) passing the droplets of step (4) through a zone where the droplets are dried and form dry particles coated with a coating material formed from the precursor solution;

(6) heat-treating the coating material of step (5) on the particles to remove volatile matter on the coating material and to convert the coating material from electrically non-conducting amorphous to electrically conducting crystalline and/or to improve integrity of the coating material.

17. The method of claim 1 wherein temperature in the zone is elevated and the heat treatment of the coated particles is conducted at a temperature above the elevated temperature in the zone, the precursor is selected from the group consisting of alkoxides, nitrates, sulfates, acetates, hydroxides, hydrates, chlorides, and mixtures thereof, wherein the particles are less than about 50 microns in diameter, temperature in the zone is 100–500° C., dilution ratio in the coating slurry of milliliters of coating solution per gram of phosphor particles is 200–3000, thickness of the coating material on the particles is 2–200 nm, velocity of the droplets in the zone is 1–50 cm/sec, and residence time of the droplets in the zone is 0.1–10 seconds, including the step of mixing a precursor solution with a diluent which diluent is miscible with the precursor solution to form the coating solution, the precursor solution containing coating precursor during droplet formation, the particles are phosphor particles, and said heat treating step is carried out at 300–1500° C. over a period of 0.1–24 hours.

18. The method of claim 17 wherein the coating material is selected from the group consisting of indium tin oxide, silicon dioxide, magnesium oxide, sodium phosphate, yttrium-europium oxide, and mixtures thereof; and the precursor is selected from the group consisting of indium methyl (trimethyl) acetyl acetate, tin isopropoxide, tetraethyl orthosilicate, magnesium nitrate, yttrium chloride, europium chloride, sodium phosphate and mixtures thereof, wherein the particles are ZnS:Ag,Cl phosphor particles that can last for about 10,000 hours of continuous operation under accelerating voltages of 50–10,000 volts without losing 50%, or more, of the original brightness, and including the step of providing at least one more coating on the coated particles.

19. A method for coating solid particles comprising the steps of:

(a) adding a solid particle to a liquid precursor coating solution to form a liquid slurry;

(b) preventing precipitation or gellation of said precursor coating material as a coating on said particle;

(b) forming a droplet of said liquid slurry whereby said droplet consists of said particle and said liquid precursor coating solution;

(c) forming a coating on said particle;

(d) heat treating said coating to remove volatile matter and to convert said coating from an electrically non-conducting amorphous coating to an electrically conducting crystalline and/or to improve integrity of said coating.

* * * * *